United States Patent [19]

Richardson

[11] Patent Number: 5,136,863
[45] Date of Patent: Aug. 11, 1992

[54] ANTI-THEFT TRAILER PIN LOCK
[76] Inventor: Orville H. Richardson, 976 NE. Walnut, Roseburg, Oreg. 97470
[21] Appl. No.: 781,083
[22] Filed: Oct. 21, 1991
[51] Int. Cl.$^5$ ............................................. E05B 73/00
[52] U.S. Cl. ......................................... 70/14; 70/58; 70/232
[58] Field of Search ................ 70/14, 57, 58, 229–232

[56] References Cited

U.S. PATENT DOCUMENTS

| | | |
|---|---|---|
| 2,785,564 | 3/1957 | Rossi ..................... 70/232 |
| 2,983,133 | 5/1961 | Hruby ..................... 70/58 |
| 3,004,421 | 10/1961 | Bowler ..................... 70/232 |
| 3,112,636 | 12/1963 | McIntyre ..................... 70/232 |
| 3,181,523 | 5/1965 | Casey ..................... 70/232 |
| 3,206,955 | 9/1965 | Horovitz ..................... 70/232 X |
| 3,386,274 | 6/1968 | McIntyre ..................... 70/232 |
| 3,415,085 | 12/1968 | Eble, Jr. ..................... 70/232 |
| 3,600,914 | 8/1971 | Johnson et al. . |
| 3,757,550 | 9/1973 | Kayser . |
| 3,780,546 | 12/1973 | Longenecker ..................... 70/58 |
| 4,407,146 | 10/1983 | Nielsen, Jr. ..................... 70/232 |
| 4,480,450 | 11/1984 | Brown ..................... 70/14 |
| 4,620,718 | 11/1986 | Mickelson . |
| 4,704,883 | 11/1987 | Dykes . |
| 4,841,756 | 6/1989 | Curtis . |

FOREIGN PATENT DOCUMENTS 2229688  10/1990  United Kingdom ..................... 70/14

Primary Examiner—Renee S. Luebke
Assistant Examiner—Suzanne L. Dino
Attorney, Agent, or Firm—Edward B. Anderson

[57] ABSTRACT

An inner member and outer member enclose a trailer kingpin. The inner member has an outer shell with a laterally extending slot for receiving the kingpin. Plates are mounted transversely of the shell adjacent to the slot edges for preventing axial movement of the inner member relative to the kingpin. Padlock shackles are fixedly mounted to and extend radially from the inner member. A padlock body has a key cylinder for locking the padlock body onto the shackles. An outer sleeve member has an open end for receiving the inner member and shaft end, and a side opening positioned and sized to receive the padlock body during locking of the padlock body onto the shackles. The padlock body extends through the side opening when the padlock body is locked onto the shackles, whereby the inner member is fixed axially relative to the outer member and the shaft end is captured in the device.

6 Claims, 3 Drawing Sheets

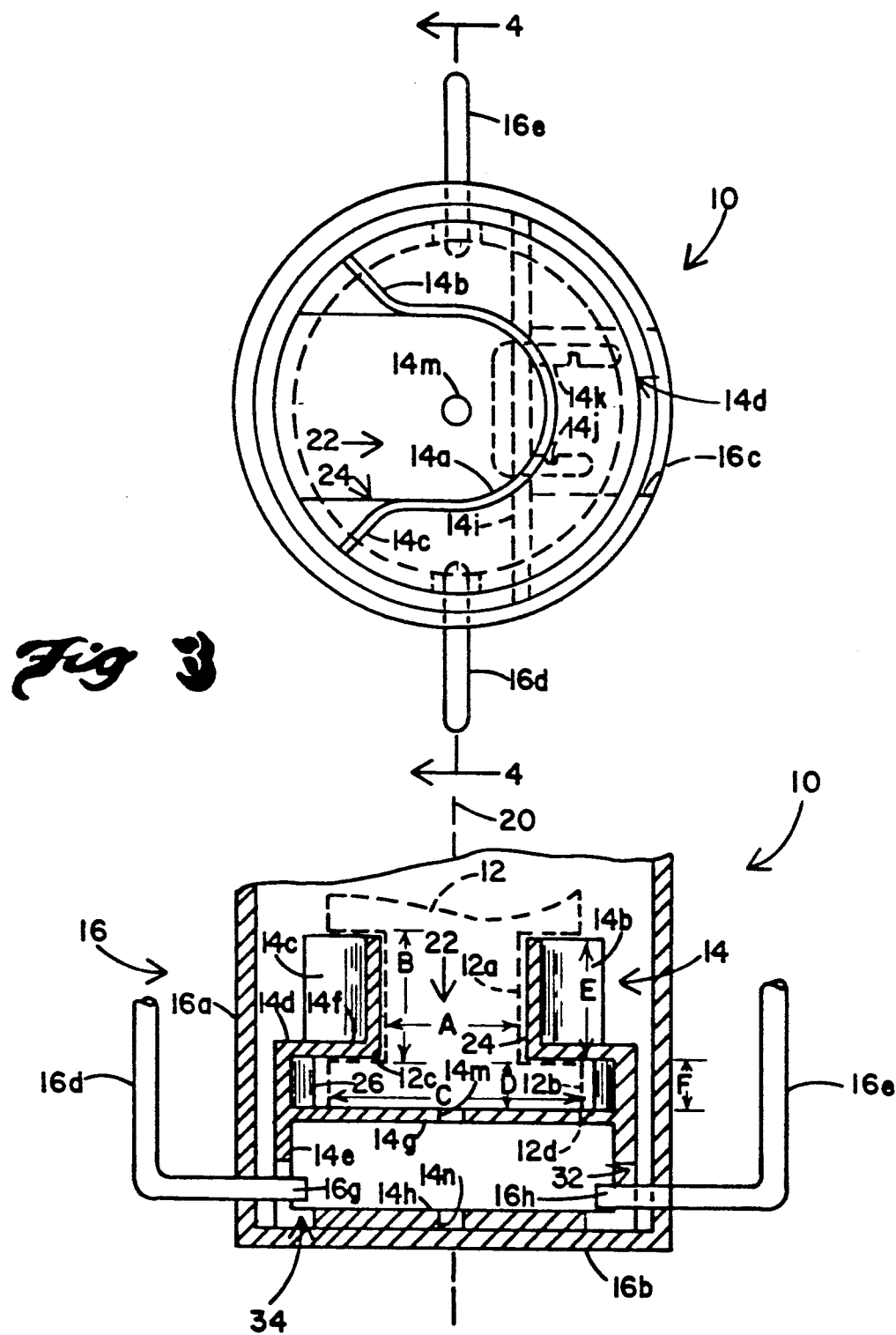

ANTI-THEFT TRAILER PIN LOCK

FIELD OF THE INVENTION

This invention relates to locks, and in particular to a locking device for a shaft, such as the kingpin of a semitrailer.

BACKGROUND OF THE INVENTION

The conventional tractor-trailer hitch or coupling structure has been standardized so that practically any tractor or fifth-wheel truck can be coupled to any trailer. Truck trailers and recreational fifth-wheel trailers have a kingbolt or kingpin depending from the forward end that is engaged and pulled by a tractor or truck with a fifth wheel. A fifth-wheel has a skid plate with an opening in which the pin is engaged and carried. The kingpin has an annular groove that is engaged by movable jaws of the fifth wheel. When the kingpin is locked into engagement with the fifth wheel, the trailer can be hauled by the tractor or truck.

Often, when a semi-trailer is delivered to its destination, it is uncoupled from the tractor and left until it is unloaded, reloaded or stored. Similarly, recreational fifth-wheel trailers are often left unattended when it is desired to store them and use the hauling vehicles for personal transportation. Thus, trailers are often left unattended. Because of the standardization of fifth-wheel hitches, it is simple for a thief to couple his or her own tractor or truck to an unattended trailer and haul it away.

In order to deter such occurrences, various devices have been developed to enclose the kingpin in a portable housing to prevent the attached trailer from being stolen. For instance, Johnson et al. in U.S. Pat. No. 3,600,914 disclose a lock body having a hemispherical surface. It requires a set screw in a bore to engage the groove of the kingpin. A removable lock cylinder then is inserted into the bore and a cam element locked into a side groove to prevent access to the set screw. While effective, this device requires a massive body and the manipulation of a set screw as well as a lock cylinder. It thus tends to be awkward to install and remove and somewhat expensive to manufacture.

An even more complex, and therefor expensive apparatus is disclosed by Kayser in U.S. Pat. No. 3,757,550. This device includes a housing that fits over the kingpin and an axially extending lock cylinder, mounted on the housing, that moves a plurality of pivoting members into engagement with the kingpin groove.

A more simplified approach is shown in U.S. Pat. No. 4,620,718 issued to Mickelson. A housing for enclosing the kingpin has an enlarged portion extending from a cavity that receives the kingpin. This enlargement has a channel into which a sliding member is inserted until an end extends into the kingpin groove. The sliding member has a lateral slot corresponding to a slot in the enlarged housing portion for receipt of the body of a padlock. The padlock secures the sliding member. This apparatus is also effective, but is very heavy if made of a durable metal capable of withstanding physical tampering.

A substantially lighter device is described by Dykes in U.S. Pat. No. 4,704,883. This device simply includes a housing for enclosing the kingpin. A lock cylinder extends through a laterally extending tube for selective engagement of the kingpin groove by a cam element. This device is subject to possible physical removal by hammering on the protruding lock cylinder until it breaks or overpowering the lock cam element by prying on the housing.

Another device which is clever but also subject to being defeated by physical attack is that disclosed in U.S. Pat. No. 4,841,756 issued to Curtis. This device also has a housing for enclosing the kingpin. It is similar to the device of Mickelson but without the slider element. Curtis' device simply uses the lock shackle to engage the groove of a kingpin. Although favorable for its simplicity, the only thing securing the device on the kingpin is the shackle. It is likely that with sufficient weight, the shackle could be overcome and the device removed by sufficient prying on the housing.

There thus remains a need for a kingpin locking apparatus that is simple in structure, and therefor relatively inexpensive to make, while being sturdy enough to withstand substantial physical attack.

SUMMARY OF THE INVENTION

These features are provided in the present invention by a device having an inner member that laterally engages the groove of the kingpin and an outer, sleeve member that receives and is lockable to the inner member.

A device made according to the invention encloses an end of a shaft, such as a kingpin, disposed along an axis, the shaft end having an enlarged end portion and a reduced size adjacent portion, such as a groove. It includes an inner member positionable laterally onto the shaft for engaging the adjacent portion and thereby preventing axial movement of the inner member from the shaft. An outer member has an inner cavity with an opening for receiving axially the inner member and shaft and thereby preventing lateral movement of the inner member relative to the shaft. A lock locks the outer member and inner member together when the inner member is received in the outer member. The shaft is thereby captured in the inner member.

The preferred embodiment of the invention encloses a cylindrical shaft disposed along an axis, the shaft having a neck or groove of a predetermined diameter. A radially extending, annular flange of a diameter larger than that of the neck or groove is adjacent to the shaft end, and has axially oppositely facing, radially extending surfaces.

The inner member has an outer shell sized to receive the flange and a laterally extending slot with axially spaced edges for receiving the flange. Plates are mounted transversely of the shell adjacent to the slot edges for preventing axial movement of the inner member relative to the shaft when the flange is received in the slot.

Padlock shackles are fixedly mounted to and extend radially from the inner member. A padlock body has a key cylinder for locking the padlock body onto the shackles.

An outer sleeve member has an open end for receiving the inner member and shaft, and a side opening positioned and sized to receive the padlock body during locking of the padlock body onto the shackles. The padlock body extends through the side opening when the padlock body is locked onto the shackles, whereby the inner member is fixed relative to the outer member and the shaft is captured in the device.

This device is simple to construct, is relatively immune to physical attack, and provides a housing in which a kingpin end is locked for preventing theft of an associated trailer.

These and other features and advantages of the present invention will be apparent from the following detailed description of the preferred embodiment of the invention and the accompanying drawings.

BRIEF DESCRIPTION OF THE DRAWINGS

FIG. 3 is a top view of the device of FIG. 1 without the kingpin.

FIG. 4 is a cross section taken along line 4—4 of FIG. 3.

DETAILED DESCRIPTION OF THE PREFERRED EMBODIMENT

Referring initially to FIGS. 1-4, a device, shown generally at 10, made according to the invention is used for enclosing a shaft, such as a trailer kingpin 12. Device 10 includes an inner member 14, an outer member 16 and a lock assembly 18.

Figure 1:
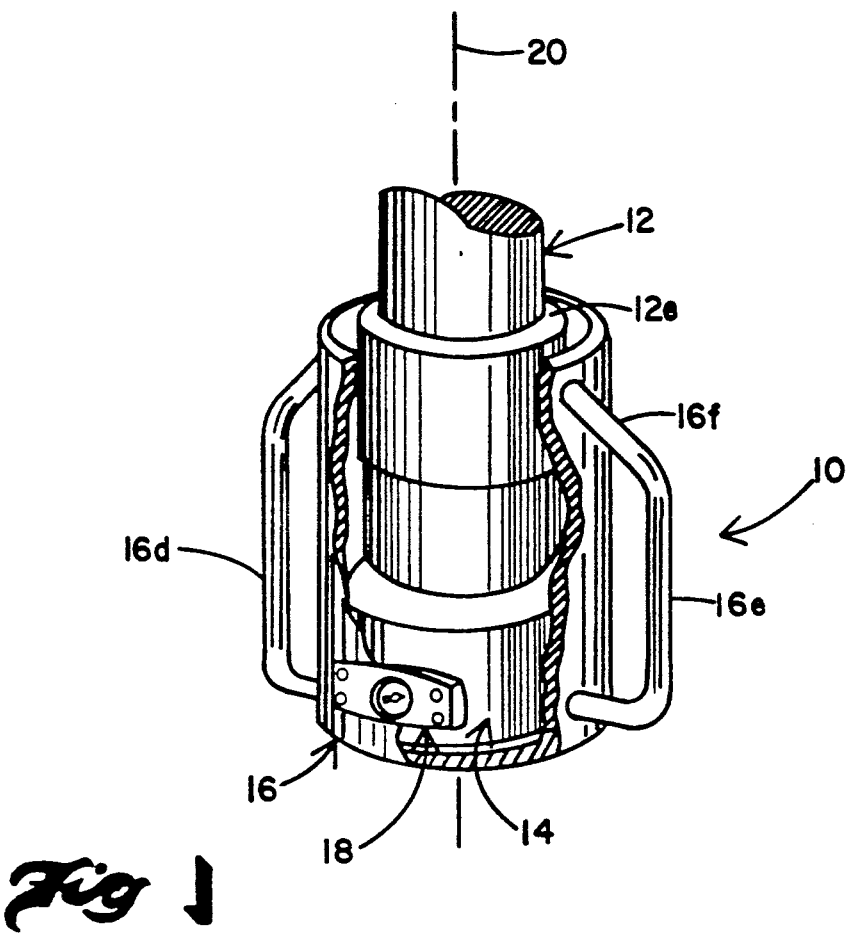
FIG. 1 is a partial fragmentary perspective view of a device made according to the invention in a position locked to a kingpin.

As shown in solid lines in FIG. 1, and in dashed lines in FIG. 4, kingpin 12 is cylindrically shaped about an axis 20. A groove 12a has a reduced diameter A and an axial or longitudinal length B. This groove is also referred to as a neck or engage portion.

The kingpin also has an enlarged distal portion that, relative to the groove, is in the form of a flange 12b of a diameter C larger than diameter A, and with an axial length D. The flange is formed by opposite, radially extending face 12c and shaft end 12d. Although not shown, the kingpin is mounted to a trailer having a horizontal plate positioned on a shoulder 12e, shown in FIG. 1.

Inner member 14 is also generally cylindrically shaped. It includes a groove-receiving partial sleeve 14a open laterally to form a channel 22. The opposite sides 14b and 14c of the partial sleeve are flared, as shown, to facilitate placement on the kingpin. The partial sleeve has an axial length E slightly less than length B of the groove for mating receipt of the partial sleeve in the groove.

A base portion 14d has an outer shell 14e sized large enough to contain flange 12b. An upper transverse plate 14f mounted to shell 14e has a channel 24 conforming with partial sleeve channel 22, as shown in FIG. 3. An intermediate plate 14g closes the cavity formed by shell 14e at a distance F slightly larger than flange thickness D. A slot 26 exists in outer shell 14e between plates 14f and 14g to allow passage of flange 12b.

Figure 2:
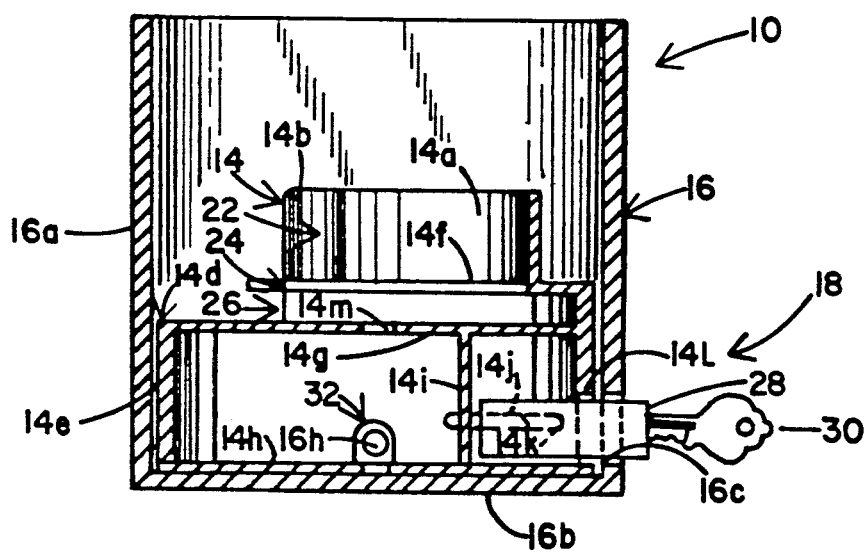
FIG. 2 is a cross section of the device of FIG. 1, not to scale, showing the locking mechanism and slot for receiving the end of a kingpin.

Shell 14e is terminated with a lateral end plate 14h spaced from plate 14g. An axially extending plate 14i forms a chord across the outer shell of the inner member, as shown in FIGS. 2 and 3. Plate 14i has mounted to it a pair of outwardly extending padlock shackles 14j and 14k. A lock opening 14l exists in shell 14e sized to conform to a padlock body 28, as shown particularly in FIG. 2. Padlock body 28 is inserted through opening 14l until it engages shackles 14j and 14k. A key 30 is used to release the padlock body from the shackles.

Adjacent to the ends of plate 14i at diametrally opposed positions are guide channels 32 and 34 formed in bottom plate 14h and associated bottom edge of shell 14e. These channels are used to facilitate orienting the inner member in the outer member, as is further described below.

Plates 14g and 14h each have a respective apertures 14m and 14n. These apertures allow ventilation of the cavity between the associated plates during manufacture, and do not contribute to the functioning of device 10.

Outer member 16 is formed as a cylindrical sleeve 16a closed at one end by a plate 16b. Sleeve 16a is sized to receive inner member 14 with kingpin 12, as shown in FIGS. 1 and 4. The diameter of sleeve 16a must be small enough to prevent the lateral removal of the kingpin from the inner member.

Adjacent end plate 16b is a lock opening 16c positioned to be aligned with and sized like opening 14l to accommodate receipt of padlock body 28. Shackle mounting plate 14i, and therefore shackles 14j and 14k, are positioned so that the padlock body extends through both lock openings when the padlock body lockingly engages the shackles. This prevents the removal of the inner member from the outer member. When a kingpin is positioned in the inner member, it cannot be removed laterally from the inner member because of outer member 16 and the inner member cannot be removed from the outer member because of the lock body extending through both openings 14l and 16c. The lock assembly is thus formed of padlock body 28, shackles 14j and 14k, and lock openings 14l and 16c.

Outer member 16 also has a pair of opposed handles 16d and 16e, as shown particularly in FIG. 1. There are two handles to accommodate both left- and right-handed people. The top portions of the handles, such as portion 16f, are sloped downwardly so that any prying devices inserted between the trailer mounting plate and the handle will slip off the handle.

As shown in FIG. 4, the bottom ends 16g and 16h of the handles preferably extend through sleeve 16a and into the inner cavity that receives inner member 14. Ends 16g and 16h are sized to be received in guide channels 32 and 34. This facilitates the orienting of the inner member with the outer member so that the lock openings are aligned. The inner member end plate will not seat against the outer member end plate unless the handle ends are aligned with the guide channels.

Device 10 is preferably made of a hard material, such as a stainless steel alloy, to make it less subject to destruction from physical attack. The inner and outer members are readily fabricated using conventional fabrication techniques, such as by welding.

Figure 5:
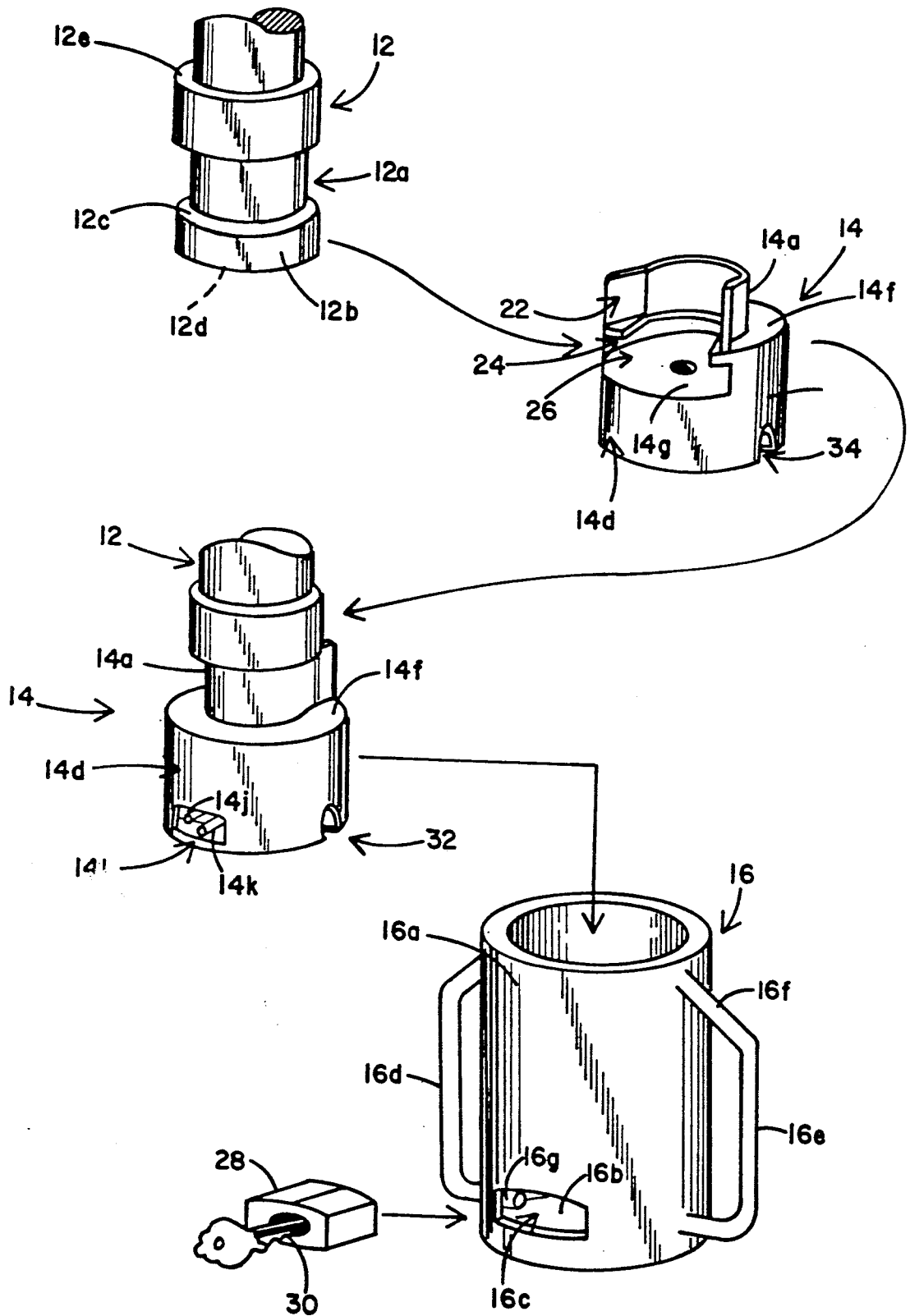
FIG. 5 is an illustration of the steps of assembly of the device of FIG. 1 for locking a kingpin.

This completes the description of device 10. FIG. 5 illustrates in a series of three steps the procedure for locking a kingpin 12 with a device 10 to prevent theft of a trailer to which it is connected. Inner member 14 is rotated so that channel 22 is facing kingpin 12 and slot 26 is aligned with flange 12b. The inner member is then slid laterally against the kingpin so that neck or groove portion 14a is received in channel 22 and flange 12b is fully received within slot 26, as shown in the third illustration.

The inner shell may then be rotated so that the lock opening is facing in a convenient direction. Outer member 16 is then moved up around the inner member and kingpin with lock opening 16c generally aligned circumferentially with lock opening 14l. The outer member is raised until the lock openings are aligned. If they are out of alignment, the bottom of the inner member will hit handle ends 16g and 16h. The outer member can then simply be rotated until the handle ends fit up into the guide channels. Padlock body 28 is then inserted through openings 16c and 14l until it engages with shackles 14j and 14k. This secures the device to the kingpin. While in place on the kingpin, a fifth-wheel hitch cannot be connected to the trailer, and attempted thefts of the trailer are thwarted.

Capture of the device axially on the kingpin is provided by two related elements of the inner member. The partial sleeve 14a is sized to matingly fit in groove 12a of a conventional kingpin. So long as this element is prevented from moving laterally of the kingpin and is locked to the outer member, it provides the necessary blocking of movement to make the device functional according to the invention.

An alternative way of viewing the kingpin is the existence of an enlarged end flange 12b. So long as the inner member abuts at least the upper surface 12c it cannot be axially removed from the kingpin. In order to capture axially the kingpin relative to the inner member it is sufficient to fix elements, such as plates 14g and 14h, adjacent to both radially extending surfaces of the flange.

As a result of the use of both of these structures in a single embodiment, the device 10 very rigidly is held in position on a kingpin.

The padlock body is preferably made of a substantially solid mass, such as a boater's padlock, sold by Master. This assures that the padlock body cannot be readily deformed or destroyed by tampering.

This device can be used on recreational fifth-wheel trailers as well as tractor-trailer rigs. Except for the handles, which do not affect the locking function of the device, and a preferably short protruding portion of the padlock body out of the side of the outer member, the preferred embodiment has only a closed cylindrical exterior. It also preferably has an overall axial length that positions the top rim of the outer member against the trailer plate. Tampering with the functional elements of the device is thus very difficult. Further, it is made of two elements, other than the padlock body, that do not have any moving parts and are readily fabricated.

It will be apparent to one skilled in the art that variations in form and detail may be made in the preferred embodiment without varying from the spirit and scope of the invention as defined in the claims. For instance, the inner and outer members can be locked together in other ways and at other places. The inner and outer members do not have to be made of solid cylindrical walls. The preferred embodiment is thus provided for purposes of explanation and illustration, but not limitation.

I claim:

1. A device for enclosing a shaft disposed along an axis, the shaft having a larger portion and a smaller portion, the larger portion having a larger radial dimension than the smaller portion, the device comprising:
   an inner member positionable laterally onto the shaft for engaging the smaller portion and thereby preventing axial movement of the inner member relative to the shaft in a direction that the larger portion is relative to the smaller portion;
   an outer member having an inner cavity with an opening for receiving, in a direction along the axis, the inner member and shaft, and thereby preventing lateral movement of the inner member relative to the axis when the inner member is received in the outer member; and
   means for locking the outer member and inner member together when the inner member is received in the outer member, and thereby capturing the shaft in the inner member.

2. A device according to claim 1 wherein the inner member includes a laterally opening slot sized to receive the larger portion of the shaft.

3. A device according to claim 1 wherein the inner member includes a protrusion for extending into the smaller portion of the shaft when the inner member is positioned laterally onto the shaft.

4. A device according to claim 3 wherein the smaller portion is a groove of a predetermined axial length and the protrusion has a length corresponding to the predetermined axial length.

5. A device according to claim 1 wherein the locking means includes a lock body, an opening extending laterally in the outer member sized to receive the lock body, and means for fixedly mounting the lock body relative to the inner member with the lock body extending through the outer member opening, whereby the lock body prevents axial movement of the outer member relative to the inner member.

6. A device for enclosing an end of a cylindrical shaft disposed along an axis, the shaft having a neck of a predetermined diameter and a radially extending, annular flange adjacent to the shaft end of a diameter larger than that of the neck, the flange having a radially extending face opposite from the shaft end, the device comprising:
   an inner member having an outer shell sized to contain the flange, a laterally facing opening for receiving the flange, and a plate extending transversely across the shell adjacent to the opening for placement adjacent to the radially extending flange face for preventing axial movement of the plate toward the shaft end when the flange is received in the slot;
   padlock shackles fixedly mounted to and extending radially from the inner member;
   a padlock body having a key cylinder for locking the padlock body onto the shackles; and
   an outer sleeve member having an inner cavity with an open end for receiving, in a direction along the axis, the inner member and shaft end, and a side opening positioned and sized to receive the padlock body during locking of the padlock body onto the shackles;
   the padlock body extending through the side opening when the padlock body is locked onto the shackles, whereby the inner member is substantially fixed in axial position relative to the outer member, the shaft is not laterally removable from the inner member, and the shaft flange is captured in the device.

* * * * *